(12) United States Patent
Aramburu Eizaguirre et al.

(10) Patent No.: US 11,760,582 B2
(45) Date of Patent: Sep. 19, 2023

(54) PRODUCT PACKAGING INSTALLATION

(71) Applicant: ULMA Packaging, S. Coop., Oñati (ES)

(72) Inventors: Aitzol Aramburu Eizaguirre, Oñati (ES); Shanti Galfarsoro Urrestilla, Oñati (ES)

(73) Assignee: ULMA PACKAGING, S. COOP., Oñati (ES)

( * ) Notice: Subject to any disclaimer, the term of this patent is extended or adjusted under 35 U.S.C. 154(b) by 0 days.

(21) Appl. No.: 17/503,706

(22) Filed: Oct. 18, 2021

(65) Prior Publication Data
US 2022/0289497 A1    Sep. 15, 2022

(30) Foreign Application Priority Data
Nov. 3, 2020 (EP) .................................. 20382952

(51) Int. Cl.
| | |
|---|---|
| *B65G 47/31* | (2006.01) |
| *B65B 9/00* | (2006.01) |
| *B65B 57/14* | (2006.01) |
| *B65B 35/56* | (2006.01) |
| *B65B 11/00* | (2006.01) |

(Continued)

(52) U.S. Cl.
CPC ............. *B65G 47/31* (2013.01); *B65B 9/00* (2013.01); *B65B 11/00* (2013.01); *B65B 35/405* (2013.01); *B65B 35/54* (2013.01); *B65B 35/56* (2013.01); *B65B 57/14* (2013.01); *B65B 65/003* (2013.01); *B65G 47/244* (2013.01); *B65G 47/8892* (2013.01); *B65G 2811/095* (2013.01)

(58) Field of Classification Search
CPC ........... B65B 9/00; B65B 9/09; B65B 35/405; B65B 35/54; B65B 35/56; B65B 35/44; B65B 65/003; B65B 11/00; B65B 57/14; B65G 47/31; B65G 47/8892; B65G 47/244; B65G 2811/095
See application file for complete search history.

(56) References Cited

U.S. PATENT DOCUMENTS

| | | | |
|---|---|---|---|
| 2007/0283664 A1* | 12/2007 | Leighton ................... | B65B 9/20 53/133.4 |
| 2010/0083622 A1 | 4/2010 | Huber | |
| 2022/0340374 A1* | 10/2022 | Stollhof ............... | B65G 47/084 |

FOREIGN PATENT DOCUMENTS

| | | | | |
|---|---|---|---|---|
| GB | 2325450 A | * | 11/1998 | ........... B65B 25/064 |
| GB | 2468856 A | * | 9/2010 | ............. A23B 4/064 |

* cited by examiner

*Primary Examiner* — Thomas M Wittenschlaeger
(74) *Attorney, Agent, or Firm* — Edell, Shapiro & Finnan, LLC

(57) ABSTRACT

A packaging installation that includes a grouping machine configured to form batches of products and a horizontal form-fill-seal packaging machine arranged downstream the grouping machine and being configured to receive the formed batches of products and to package them in individual packages. The grouping machine includes a receiving area to receive the products and a grouping area where the products are grouped into batches, and, for transporting products to the grouping area. The grouping machine includes a first product path and a second product path, different from the first product path, extending from the product receiving area to the grouping area. According to one embodiment, the grouping machine is configured to cause the products arriving at the grouping area from the first product path and from the second product path to have different orientations.

20 Claims, 12 Drawing Sheets

(51) Int. Cl.
*B65B 65/00* (2006.01)
*B65B 35/40* (2006.01)
*B65G 47/88* (2006.01)
*B65G 47/244* (2006.01)
*B65B 35/54* (2006.01)

PRODUCT PACKAGING INSTALLATION

CROSS-REFERENCE TO RELATED APPLICATIONS

This application relates to and claims the benefit and priority to European Application No. EP20382952.8, filed Mar. 11, 2021.

TECHNICAL FIELD

The present invention relates to product packaging installations.

BACKGROUND

Machines for packaging products of different types, depending on the required packaging, are known. In some cases, the products are packaged individually (each product or quantity of product in a single package), and in other cases a plurality of products are grouped, each group of products forming a batch of products. In the latter case, it is common for a user to group manually the products as required, and to arrange said products accordingly, to be packaged as a batch.

U.S. Publication No. 2010/0083622A1 discloses a packaging installation comprising a grouping machine that receives the products to be grouped in batches. The products are fed to the installation on a first conveyor belt, and they advance to a second conveyor belt arranged downstream. In the second conveyor belt a robot positions the products in the required way, changing its orientation if necessary, to achieve the required product batches. From the second conveyor belt, once arranged and oriented as required, the batches are evacuated to an exit conveyor belt for being palletized.

SUMMARY

Disclosed is a product packaging installation. The packaging installation comprises a grouping machine configured to form batches of products with at least a first row and a second row of products, said rows being parallel to each other and each row comprising at least one product, and a horizontal form-fill-seal packaging machine arranged downstream the grouping machine and configured to receive the batches formed in the grouping machine and to package each batch in an individual package, from at least one plastic sheet. The packaging machine comprises at least one inlet conveyor belt arranged to receive the batches formed in the grouping machine.

The grouping machine comprises:
- a product receiving area to receive the products to be grouped into batches;
- a grouping area where said products are grouped into batches;
- a batch feeding conveyor belt arranged in the grouping area and configured to feed the batches formed in said grouping area to the inlet conveyor belt of the packaging machine;
- a first product path extending from the product receiving area to the grouping area and comprising a last portion from which the products traveling along said first path arrive at the grouping area, said products forming the first row of each batch;
- a second product path extending from said receiving area to said grouping area, different from the first product path, and comprising a last portion from which the products traveling along said second path arrive at the grouping area, said products forming the second row of each batch; and
- at least one distribution device configured to cause the products present in the product receiving area to be directed towards the required product path.

The installation further comprises a control device configured to cause the controlled actuation of the distribution device and also to equalize the speed of the batch feeding conveyor belt and the speed of the inlet conveyor belt of the packaging machine at least while a batch is passing from batch feeding conveyor belt to said inlet conveyor belt.

The grouping machine is adapted for causing the products arriving at the grouping area from the last portion of the first product path and from the last portion of the second product path to have different orientations. In the context of the invention, to have a different orientation must be interpreted as one product being rotated in respect of its center, comparing with another product.

In this way, batches of products can be formed with the desired configuration in a simple and cheap way and without the need for a user or a robot to form the batches, said batches being subsequently packaged in said packaging machine. Additionally, the installation can work at a higher speed, since the products can move through the first product path and a second product at the same time to form a batch in the grouping area.

These and other advantages and features will become apparent in view of the figures and the detailed description.

DETAILED DESCRIPTION

Figure 1:
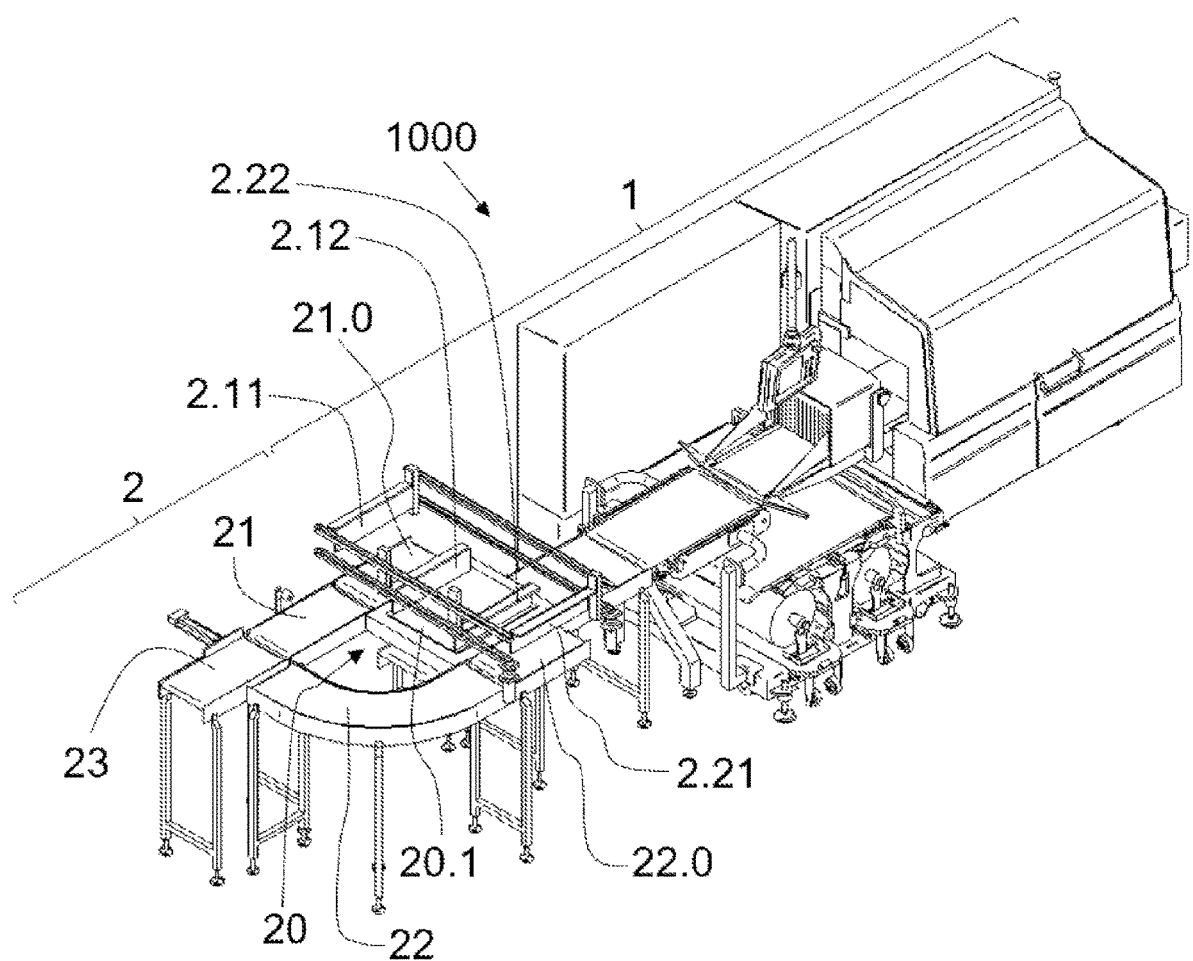
FIG. 1 shows a perspective view of a packaging installation according to one embodiment.
Figure 2:
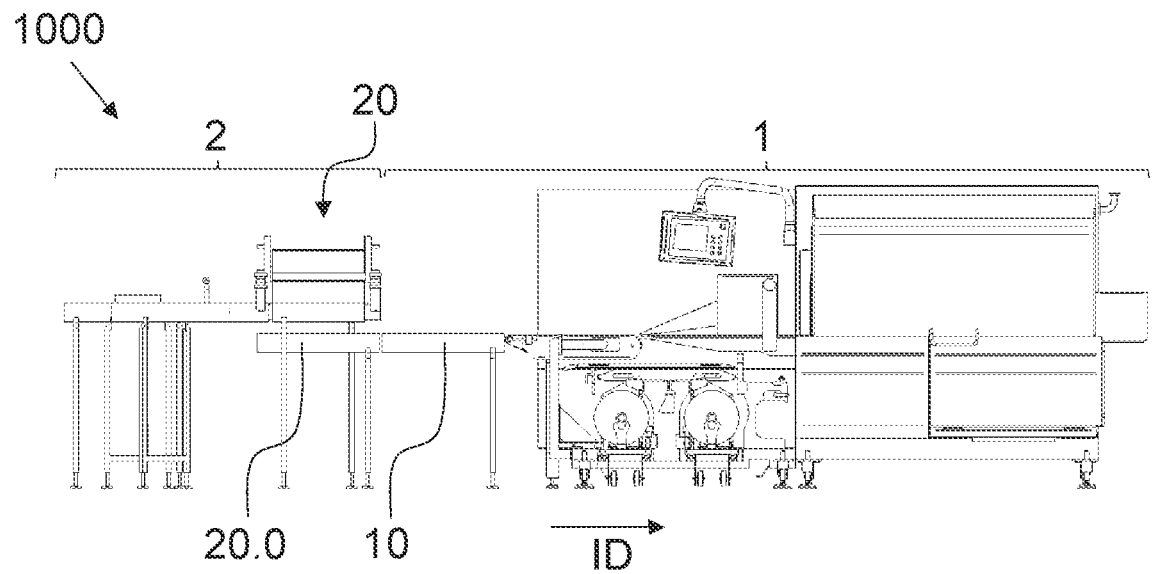
FIG. 2 shows a lateral view of the embodiment of FIG. 1.
Figure 3:
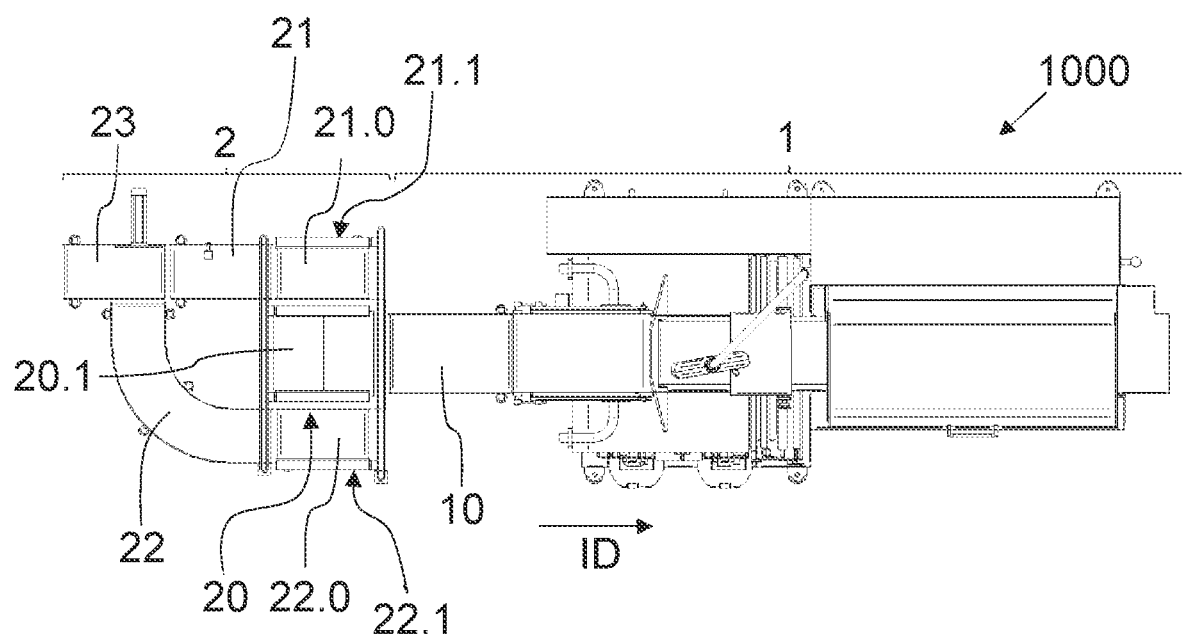
FIG. 3 shows a plan view of the embodiment of FIG. 1, without products.

FIGS. 1 to 3 illustrate a packaging installation 1000 according to one example.

The installation 1000 comprises a grouping machine 2 configured to form batches 3 of products P and a horizontal form-fill-seal packaging machine 1 downstream the grouping machine 2, said packaging machine 1 being configured to receive the batches 3 from the grouping machine 2 in one inlet conveyor belt 10, and to package each batch 3 in an individual package from a single plastic sheet or a plurality of plastic film. Said packaging machine 1 can be configured for generating an airtight package with a modified atmosphere inside, or for generating any other required and known kind of package. Said packaging machine 1 can also be of the kind of any known horizontal form-fill-seal packaging machine.

The grouping machine 2 is configured to form batches 3 of products P comprising at least a first row F1 and a second row F2 of products P, said rows F1 and F2 being parallel in respect of an installation direction ID and each row F1 and F2 comprising at least one product P. The grouping machine 2 comprises a product receiving area 23 to receive the products P to be grouped into batches 3, a grouping area 20 where said products P are grouped into batches 3. The grouping machine 2 comprises a surface in the grouping area 20, the products P arriving at said grouping area 20 being arranged on said surface, such that the batches 3 are formed on said surface. The products P can be supplied to the product receiving area 23 manually or automatically. The product receiving area 23 can comprise a conveyor belt on which the products are arranged.

The grouping machine 2 further comprises a batch feeding conveyor belt 20.0 arranged in the grouping area 20 and configured to feed the batches 3 formed in said grouping area 20 to the inlet conveyor belt 10 of the packaging machine 1 at a given speed, and the installation 1000 comprises a control device configured to equalize the speed of the batch feeding conveyor belt 20.0 and the speed of the inlet conveyor belt 10 of the packaging machine 1, at least while a batch 3 is passing from the batch feeding conveyor belt 20.0 to said inlet conveyor belt 10. Said control device can be a specific control device for said function or can be a control device also in charge of other functions. The control device can comprise a computer, a microcomputer, a controller, a microcontroller, a FPGA or any other device with calculation capacity.

For transporting products P from the product receiving area 23 to the grouping area 20, the grouping machine 2 comprises a first product path extending from the product receiving area 23 to the grouping area 20 for the products P forming the first row F1 of each batch 3, and a second product path different from the first product path, extending also from said receiving area 23 to said grouping area 20, for the products P forming the second row F2 of each batch 3. If the batch 3 of products P comprises more than two parallel rows F1 and F2, the additional rows can be formed with products P reaching the grouping area 20 through the first product path and/or through the second product path, as required, or, even, the grouping machine 2 could comprise in other embodiments and additional product path extending between the product receiving area 23 and the grouping area 20 for each additional row of products P or, at least, for one of said additional rows.

The grouping machine 2 comprises at least one distribution device configured to cause the products P present in the product receiving area 23 to be directed towards the required product path, and the control device is configured to control the actuation of the distribution device. Therefore, a product P can be directed towards the grouping area 20 through the first product path or through the second product path from the product receiving area 23 as required.

Figure 4:
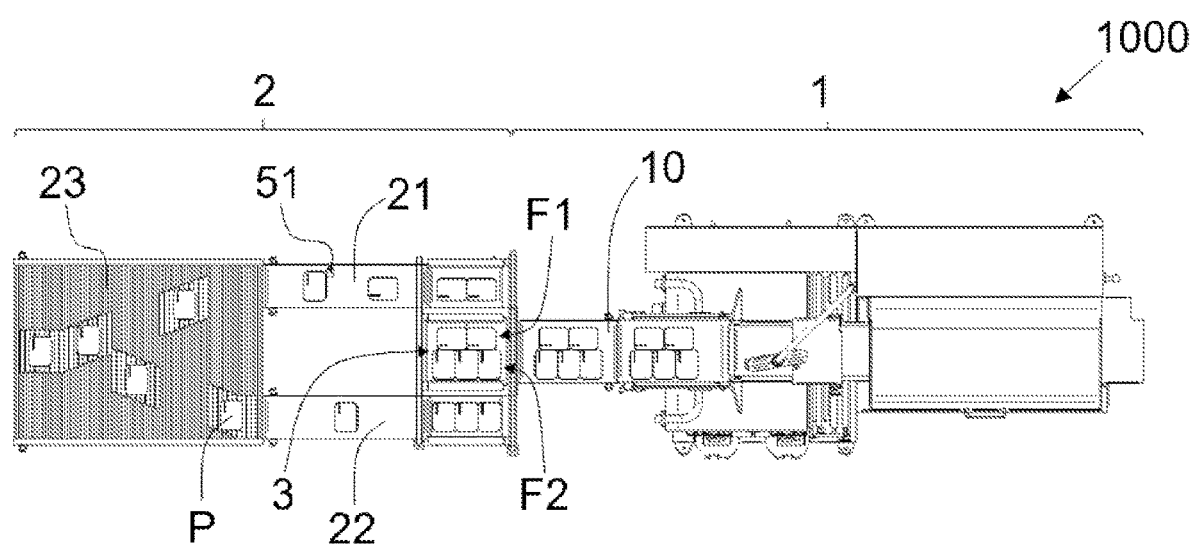
FIG. 4 shows a plan view of another embodiment of the packaging installation.

In a one embodiment, shown in FIGS. 1 to 3, when the distribution device is actuated it directs a product P towards the second product path and, if not actuated, the product P travels towards the first product path from the product receiving area 23, although, obviously, the actuation of the distribution device could direct the product P towards the second product path instead when actuated. Alternatively, said distribution device could direct a product P selectively towards the first product path or towards the second product path when actuated (see FIG. 4).

The first product path comprises a last portion 21.1 from which the products P along the first path arrive at the grouping area 20 and the second product path comprises a last portion 22.1 from which the products P along the second path arrive at the grouping area 20. The grouping machine 2 is adapted for causing the products P arriving at the grouping area 20 from the last portion of the first product path to have an orientation different from the orientation of the products P arriving at said grouping area 20 from the last portion of the second product path. Many times, it is required to form batches 3 with the products P so arranged to reduce the plastic film of the package obtained in the horizontal form-fill-seal packaging machine 1, and the inclusion of two different product paths for the products P facilitates obtaining such result, additionally allowing to do it automatically and in a more quick and efficient manner.

The different orientations for the products P arriving at the grouping area 20 from different product paths can be obtained in different ways. For example, the configuration of at least one of the product paths itself could change the orientation of the product P travelling along said product path, as occurs with the second product path of the preferred embodiment. Alternatively, the two product paths could maintain the same orientation of the products P, the grouping machine 2 comprising an orientation deviation device 51 associated to at least one of said product paths, said orientation deviation device 51 being configured to act on a product P and to change the orientation of said product P with said actuation (see FIG. 4), when required. A combination of said alternatives could also be possible, and even comprising an orientation deviation device for each product path in order to increase flexibility, if so required.

In some embodiments, as in the preferred embodiment, the grouping area 20 is arranged between the last portion of the first product path and the last portion of the second product path, but not in any of the products P traveling direction. In the preferred embodiment, therefore, the grouping machine 2 comprises a first actuation device comprising two pushing elements 2.11 and 2.12 configured to push the products P from the last portion of the first product path towards the grouping area 20 when actuated, in order to position said products P in said grouping area 20, and a second actuation device comprising two pushing elements 2.21 and 2.22 and configured to push the products P from the last portion of the second product path towards the grouping area 20 when actuated, in order to position said products P in said grouping area 20, the control device being communicated with the first actuation device and with the second actuation device and being configured to control the actuation of said first actuation device and said second actuation device. Preferably, the control device is configured to cause the simultaneous actuation of the first actuation device and the second actuation device to arrange the corresponding products P in the grouping area 20, so that the products P coming from different paths collide one against the other, said products P remaining in the correct position in the grouping area 20.

In some embodiments comprising at least one actuation device 2.1 and 2.2, the actuation device can comprise a first pushing element and a second pushing element. This occurs in the preferred embodiment, as mentioned before, where each of the actuation devices comprises a first pushing element 2.11 and 2.21 and a second pushing element 2.12 and 2.22. When the first pushing elements 2.11 and 2.21 has pushed the corresponding products P towards the grouping area 20, then said first pushing elements 2.11 and 2.21 are lifted and are caused to move back to the original position (and lowered again if the second pushing elements 2.12 and 2.22 has already been moved). At this time, the second pushing elements 2.12 and 2.22 can push another group of products P (or another product P) towards the grouping area 20 without the first pushing elements 2.11 and 2.21 disturbing said actuation (as it is lifted), the productivity being of the installation 1000 being increased. The second pushing elements 2.12 and 2.22 and then lifted and moved back as explained for the first pushing elements 2.11 and 2.21.

In other embodiments, the grouping area 20 is downstream of both product paths (in respect of the products P respective traveling direction), no actuation devices being needed, and in other embodiments the grouping area 20 is downstream one of the product paths, an actuation device being needed for pushing the products P traveling along the other product path towards the grouping area 20.

The grouping machine 2 can comprise, in any of the embodiments, at least a first conveyor belt 21 defining the first product path, on which the corresponding products P travel from the product receiving area 23 to the grouping area 20. In the preferred embodiment, said first product path is defined by a first conveyor belt 21 and a first positioning conveyor belt 21.0 arranged downstream the first conveyor belt 21 in the direction of the product P along the first product path, the corresponding products P travelling from the product receiving area 23 to the grouping area 20 on said first conveyor belt 21 and on said first positioning conveyor belt 21.0. The first positioning conveyor belt 21.0 is used to position the products P arrived from the first conveyor belt 21 in the grouping area 20 in a controlled manner, and can be controlled, preferably, independently from the first conveyor belt 21. The last portion of the first product path is on said first positioning conveyor belt 21.0.

Equally, the grouping machine 2 can comprise, in any of the embodiments, at least a second conveyor belt 22 defining the second product path, on which the corresponding products P travel from the product receiving area 23 to the grouping area 20. In the preferred embodiment, said second product path is defined by a second conveyor belt 22 and a second positioning conveyor belt 22.0 arranged downstream the second conveyor belt 22 in the direction of the product P along the second product path, the corresponding products P travelling from the product receiving area 23 to the grouping area 20 on said second conveyor belt 22 and on said second positioning conveyor belt 22.0. The second positioning conveyor belt 22.0 is used to position the products P arrived from the second conveyor belt 22 in the grouping area 20 in a controlled manner, and can be controlled, preferably, independently from the second conveyor belt 22. The last portion of the second product path is on said second positioning conveyor belt 22.0.

In the embodiments comprising a first positioning conveyor belt 21.0 and a second positioning conveyor belt 22.0, as in the preferred embodiment, the first positioning conveyor belt 21.0 and the second positioning conveyor belt 22.0 are, preferably, configured to be controlled independently from each other, such that the products P can be aligned and stored forming a row (that will be the first row F1 of the batch 3 to be formed) in the first positioning conveyor belt 21.0, and the products P can be aligned and stored forming a row (that will be the second row F2 of the batch 3 to be formed) in the second positioning conveyor belt 22.0. For example, a positioning conveyor belt can be stopped until it receives a product P. Then, said positioning conveyor belt is caused to be moved a short time, just for allowing the arrangement of a next product P on it coming from the corresponding conveyor belt 21 or 22. These steps are repeated continuously.

In some embodiments, as in the preferred embodiment, the grouping machine 2 comprises a platform 20.1 in the grouping area 20 on which the products P forming the batches 3 are arranged, and an actuator (not shown) communicated with the control device and configured to cause a movement of said platform 20.1, and the batch feeding conveyor belt 20.0 for feeding the batches 3 formed in the grouping area 20 to the packaging machine 1 at a given speed and arranged below the platform 20.1, such that when the platform 20.1 moves, the products P give up being arranged on said platform 20.1 and fall towards said batch feeding conveyor belt 20.0. The control device is configured to cause said movement of the platform 20.1 when the required number of products P has been arranged on said platform 20.1, and, preferably, also to cause the batch feeding conveyor belt 20.0 to remain stopped or to be driven at a speed lower than the given speed while the platform 20.1 is moving and at least until the complete batch 3 of products P is arranged on said batch feeding conveyor belt 20.0. Therefore, the correct arrangement of the batch 3 on said batch feeding conveyor belt 20.0 is assured. In said embodiments, the platform 20.1 is the surface of the grouping area 20 on which the products P are arranged. Preferably, a complete batch 3 is formed on the platform 20.1, said platform 20.1 being moved once the batch 3 has been formed, but it could also be required to form batches 3 comprising a plurality of floors. In the latter cases, the platform 20.1 is moved once a floor has been formed, the complete batch 3 to be supplied to the packaging machine 1 being formed once all the floors of products P has fallen towards the batch feeding conveyor belt 20.0.

The platform 20.1 can comprise different configurations. In the preferred embodiment, the platform 20.1 comprises two facing sheets 20.10 that are rotated in respect of a respective preferably horizontal axis, actuated by the platform actuator, such that an opening is generated between said sheets 20.10 through which the batch 3 falls.

In the preferred embodiment, the first product path defines a first linear portion with a given direction starting from the product receiving area 23, the distribution device comprising a pusher 24 to push a product P from the product receiving area 23 towards the second product path in a direction which is perpendicular to the given direction of said first linear portion. The orientation of the products P is changed along its travel through the second product path, 90° in the preferred embodiment, said products P reaching the grouping area 20 with a 90° difference orientation in respect of the products P reached to said grouping area 20 through the first product path.

In order to offer a most flexible installation 1000, the grouping machine 2 could further comprise at least one orientation deviation device associated to at least one of the product paths. When said orientation deviation device is actuated, said orientation deviation device acts on a product P changing the orientation of said product P. This allows to also form batches 3 with the orientation of all the products P forming part of said batch 3 being the same, if so required.

Figure 5:
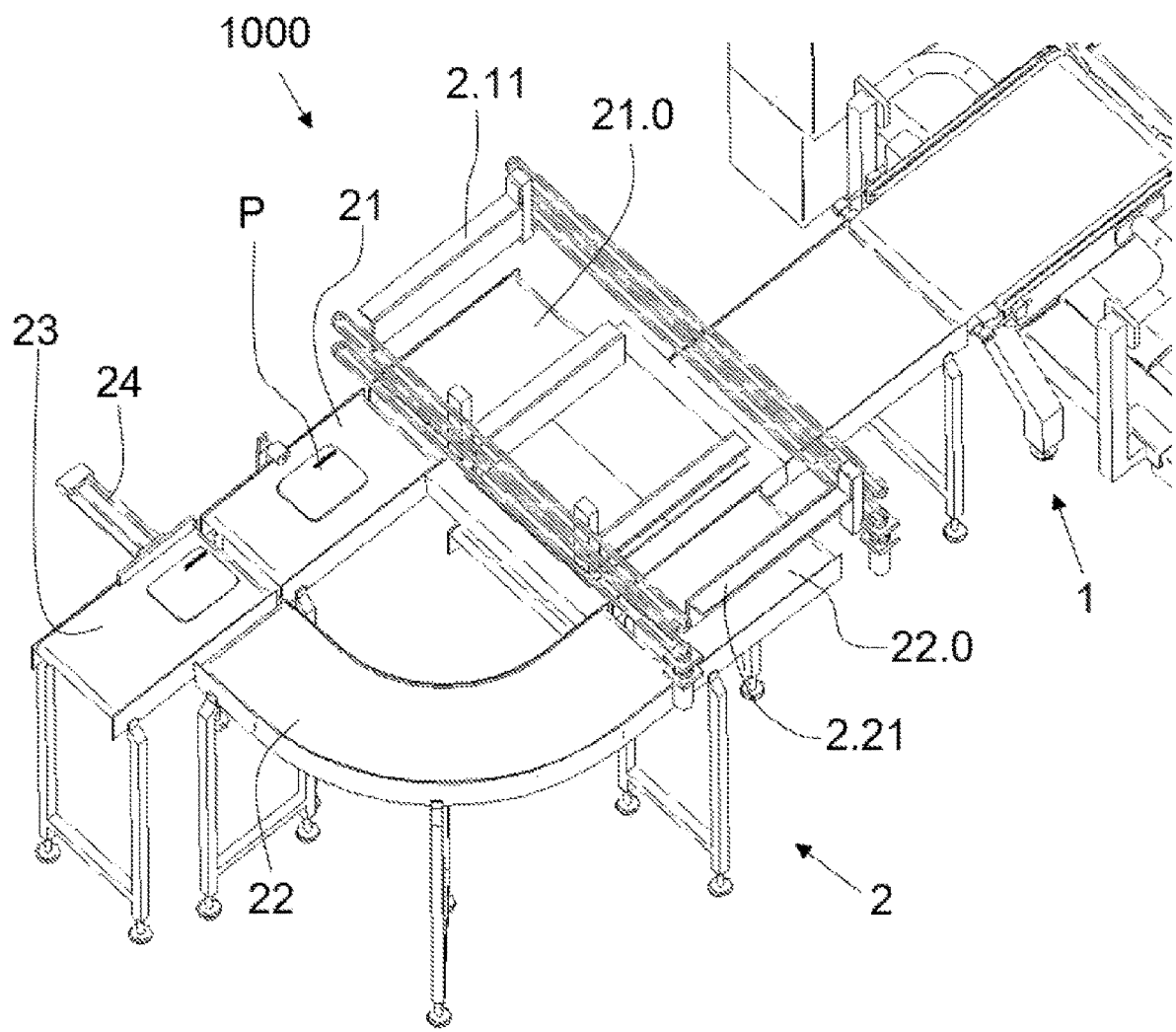
FIG. 5 shows a first step of a sequence for forming a batch of products in the packaging installation of FIG. 1, where the packaging machine is partially shown.

In FIGS. 5 to 11 an example of a process sequence for packaging batches 3 in the preferred embodiment of the invention is shown, the packaging machine 1 being only partially shown in said figures. In this example, the batches 3 are formed comprising two products P in the first row F1 and three products P in the second row F2, said three products P being oriented different from the products P of the first row F1. Other configurations could also possible if so required. Said sequence is as follows:

In FIG. 5, the products P travels from the product receiving area 23 towards the first product path directly. For it being possible, the pusher 24 is not actuated. The first positioning conveyor belt 21.0 is controlled as mentioned before.

Figure 6:
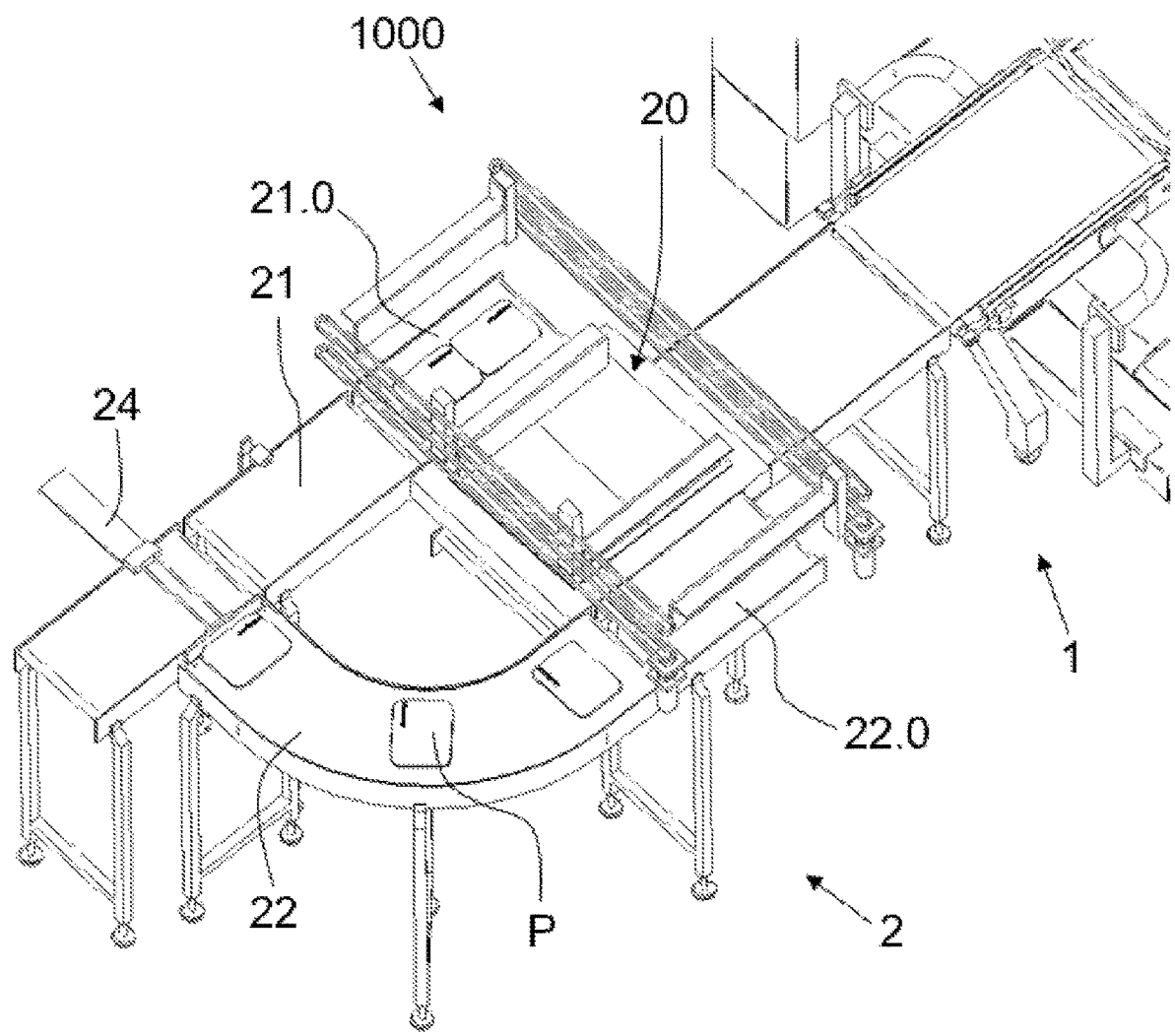
FIG. 6 shows a second step of a sequence for forming a batch of products in the packaging installation of FIG. 1, where the packaging machine is partially shown
Figure 7:
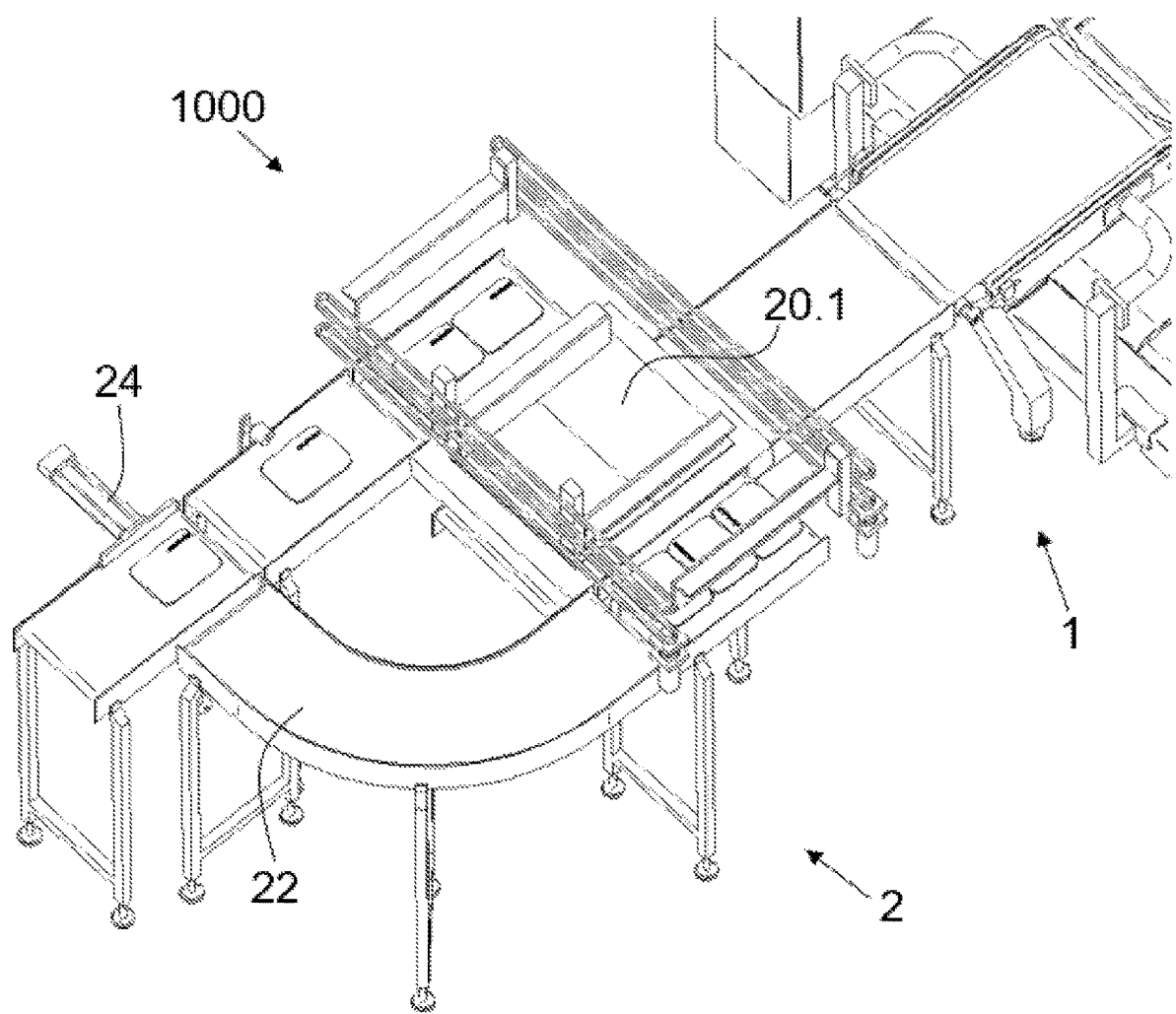
FIG. 7 shows a third step of a sequence for forming a batch of products in the packaging installation of FIG. 1, where the packaging machine is partially shown

When the required number of products P for the first row F1 are arranged in the last portion of the first product path, two in this example, the following products P are directed, one by one, towards the second product path by means of the pusher 24 (see FIG. 6). The second positioning conveyor belt 22.0 is controlled as mentioned before. The order for arranging the required number of products P for each row F1 and F2 could also be different.

The supply of the products P to the product receiving area 23 is not interrupted when the required number of products P is arranged in the last portion of both product paths (see FIG. 7), the generation and supply of batches 3 can therefore be continuous.

Figure 8:
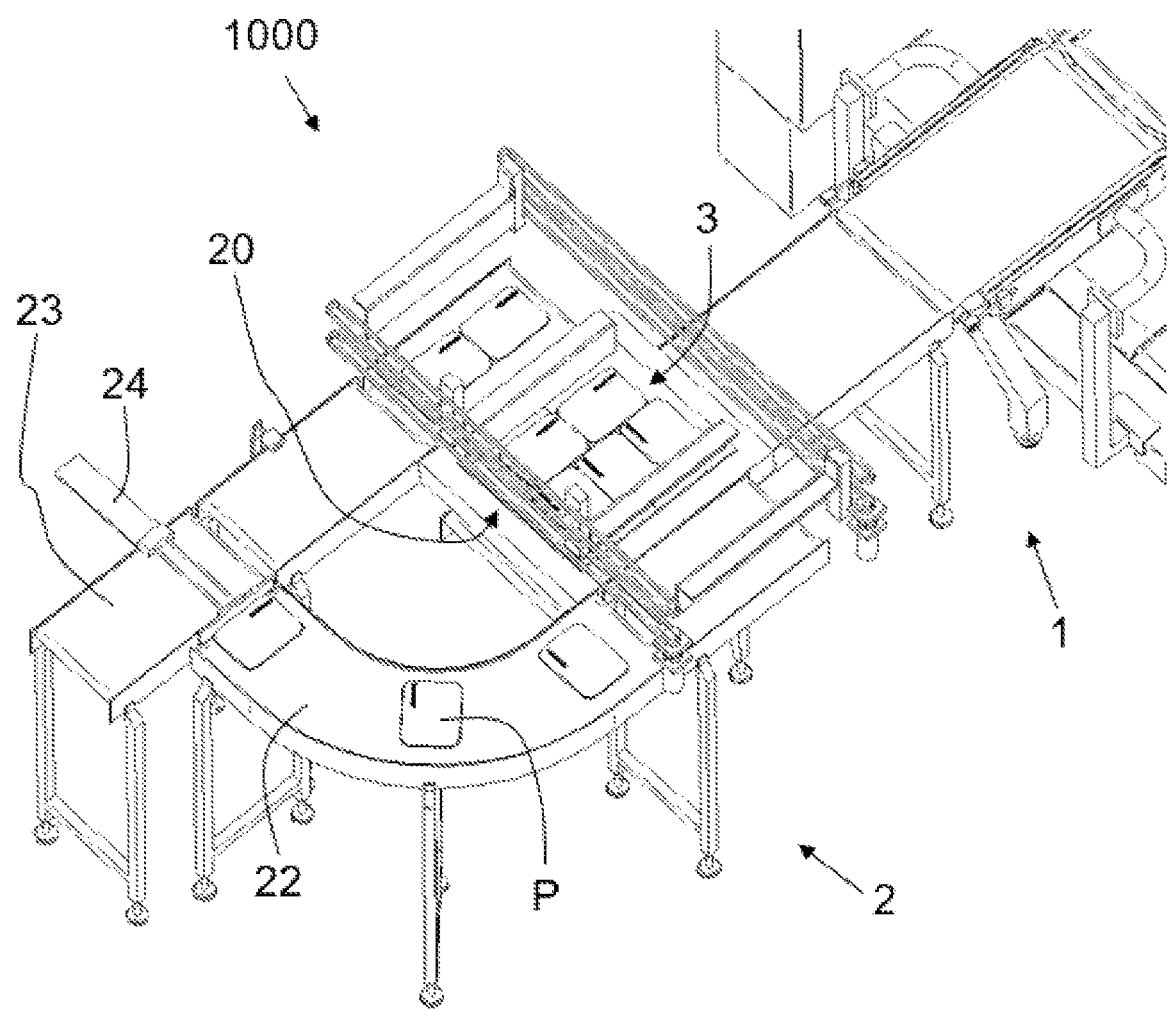
FIG. 8 shows a fourth step of a sequence for forming a batch of products in the packaging installation of FIG. 1, where the packaging machine is partially shown

Once the required number of products P is arranged in the last portions of both product paths, said products P are supplied to the grouping area 20 a batch 3 of products P being formed in said grouping area 20, while new products P are being supplied to the corresponding last portions as described (see FIG. 8). The products P are supplied to the grouping area 20 being pushed by the corresponding pushing element 2.11 or 2.12 and 2.21 or 2.22 of the respective actuation devices, that are acted on simultaneously in said preferred embodiment.

Figure 9:
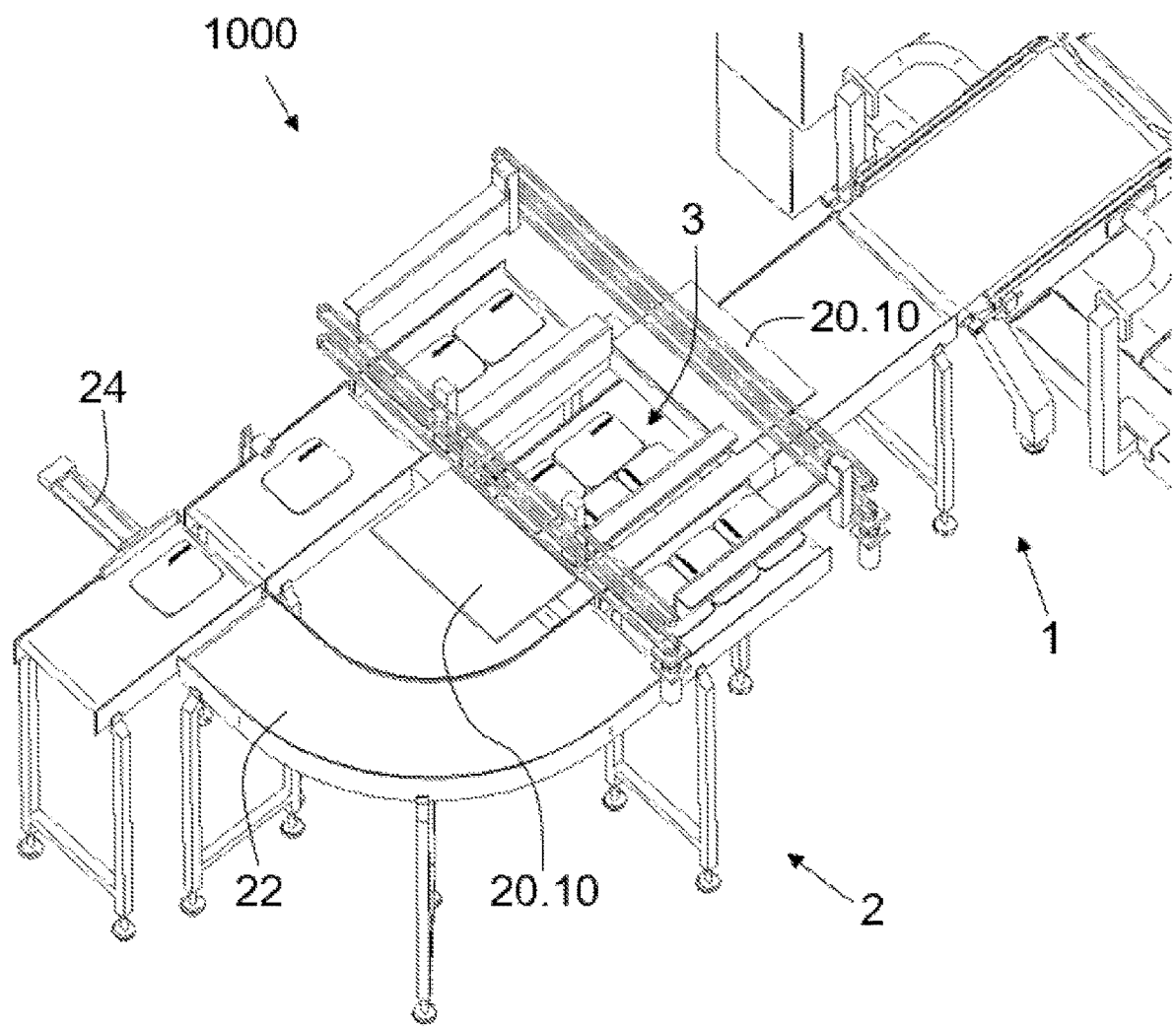
FIG. 9 shows a fifth step of a sequence for forming a batch of products in the packaging installation of FIG. 1, where the packaging machine is partially shown

After a batch 3 is formed, said batch 3 is caused to reach the batch feeding conveyor belt 20.0 (FIG. 9). This point is achieved by causing the sheets 20.10 of the platform 20.1 to be opened and at least during said operation, the batch feeding conveyor belt 20.0 is caused to remain stopped (or at a driving speed lower than the given speed).

Figure 10:
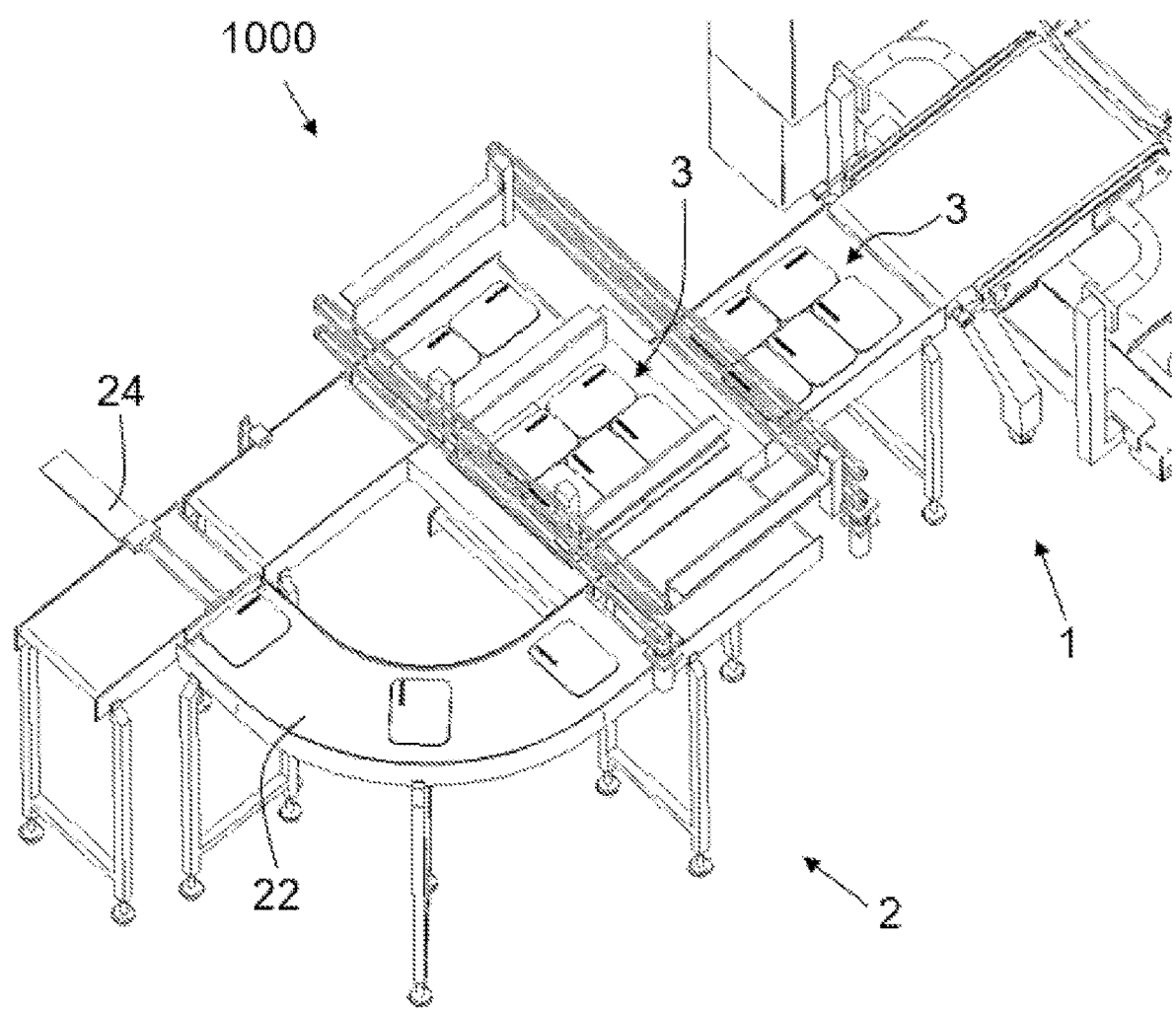
FIG. 10 shows a sixth step of a sequence for forming a batch of products in the packaging installation of FIG. 1, where the packaging machine is partially shown
Figure 11:
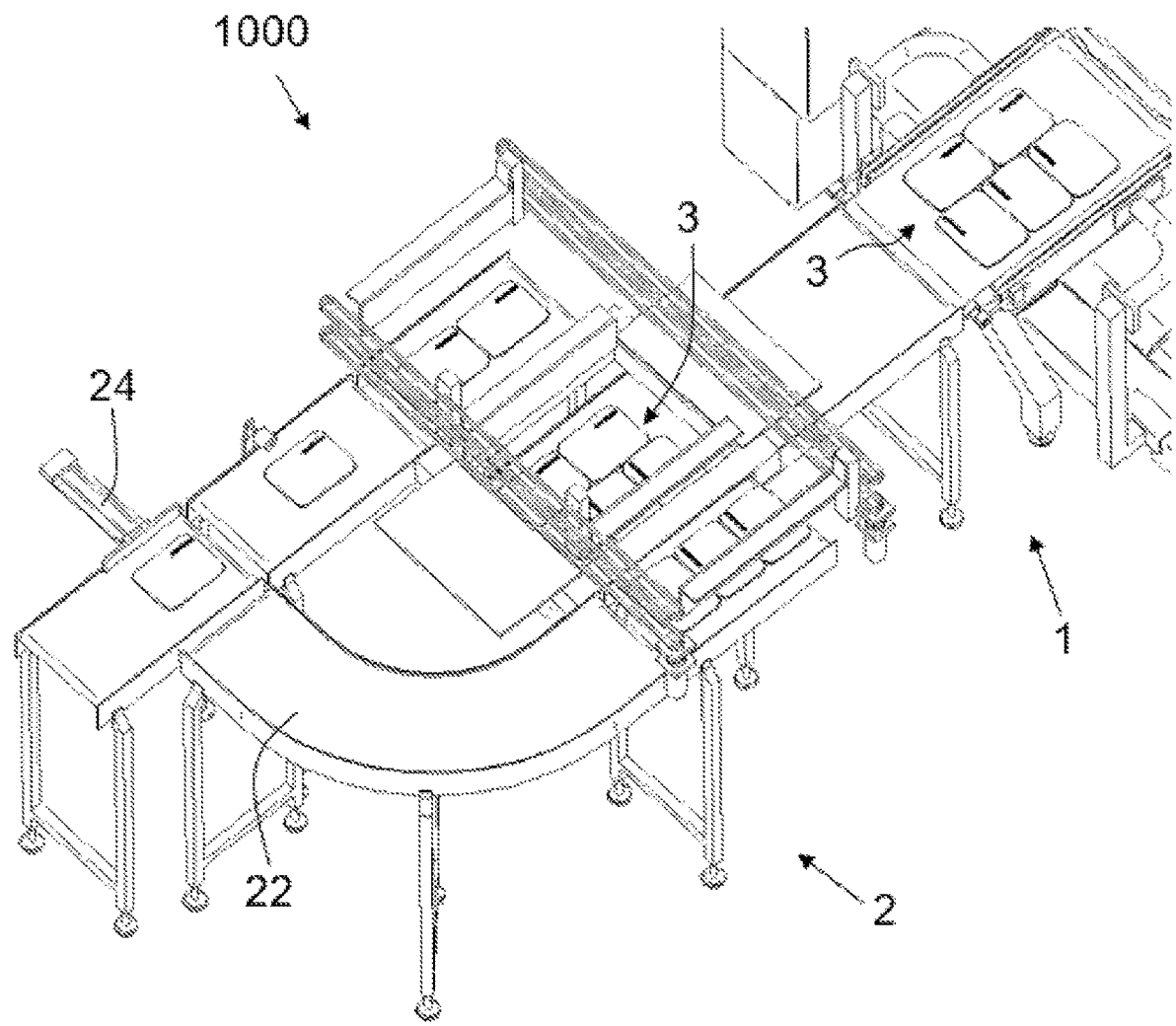
FIG. 11 shows a seventh step of a sequence for forming a batch of products in the packaging installation of FIG. 1, where the packaging machine is partially shown.

The batch 3 is then supplied towards the packaging machine 1 (FIGS. 10 and 11).

These steps can be continuously carried out, until the required number of batches 3 is formed or until no more products P are supplied to the product receiving area 23.

Figure 12:
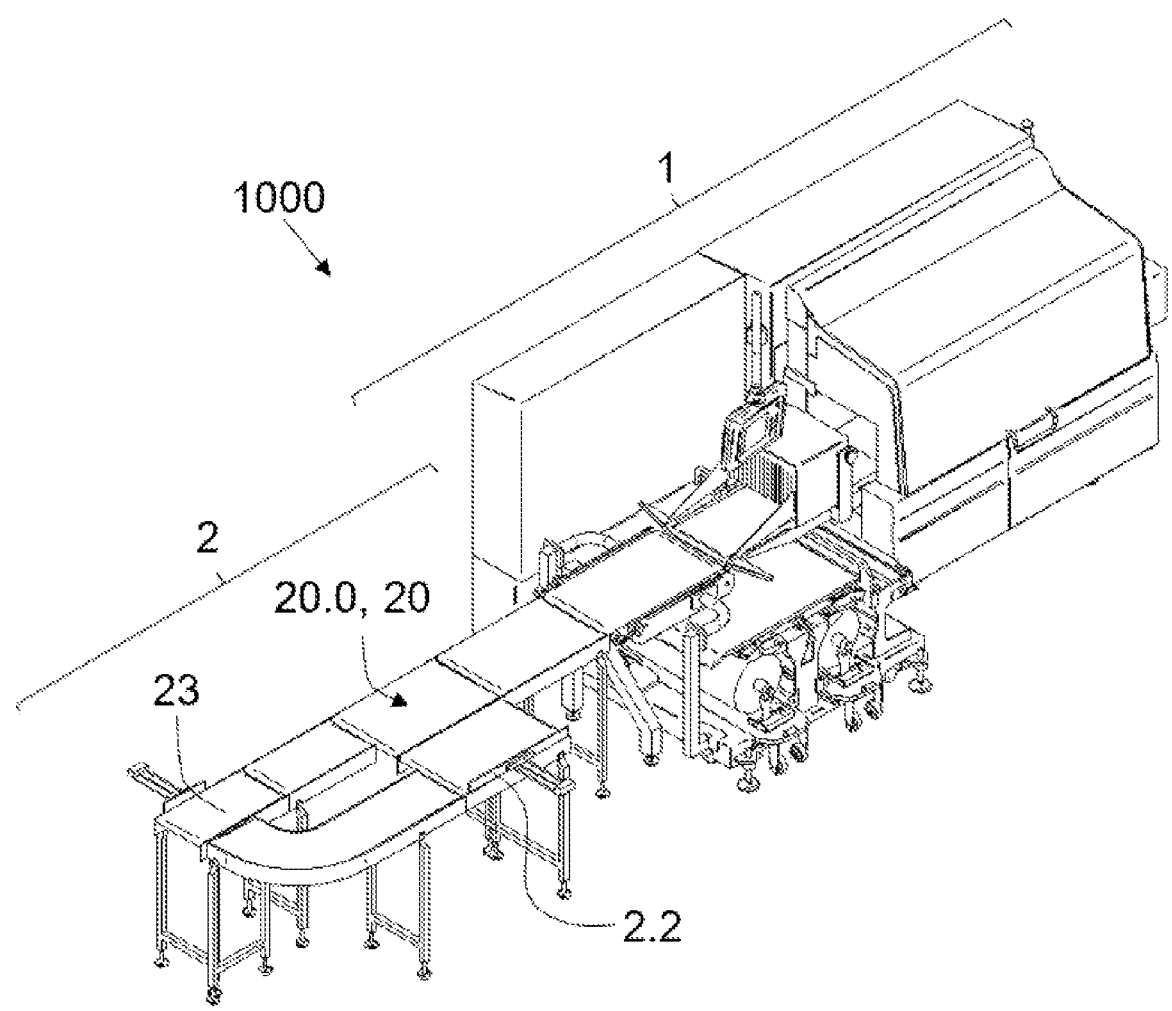
FIG. 12 shows a configuration of the first product path and a second product path for a grouping machine of a product packaging installation according to one embodiment.

In FIG. 12 another embodiment of the installation 100 is shown. In said embodiment, the grouping area 20 is arranged downstream of the first product path in the direction of the products P along said first product path, such that a product P travelling through said first product path reaches said grouping area 20 without the need of an actuation device, in contrast to the preferred embodiment. In said embodiment of FIG. 12, the products P are arranged directly on the batch feeding conveyor belt when arriving at the grouping area 20 (the batch feeding conveyor belt being then the surface of the grouping area 20 on which the products P are arranged). The batch feeding conveyor belt can be controlled to arrange the products P arriving from the first product path adequately (similar to the first positioning conveyor belt 21.0 of the preferred embodiment), but also for feeding the batches 3 to the packaging machine 1 (as the batch feeding conveyor belt 20.0 of the preferred embodiment). Alternatively, the batch feeding conveyor belt can be moving continuously, the grouping machine 2 comprising a stop for stopping the products P in the grouping area 20. The stop can be moved between a first position, in which the products P are stopped, and a second position, in which the products P are free to move. In this latter case, the control device is configured to cause the stop to move to the second position once a batch 3 has already been formed. The second product path is defined by a second conveyor belt 22 and a second positioning conveyor belt 22.0 arranged downstream the second conveyor belt 22 in the direction of the product P along the second product path, as explained for the preferred embodiment. The related explanation given for said preferred embodiment is then also valid for said embodiment.

Figure 13:
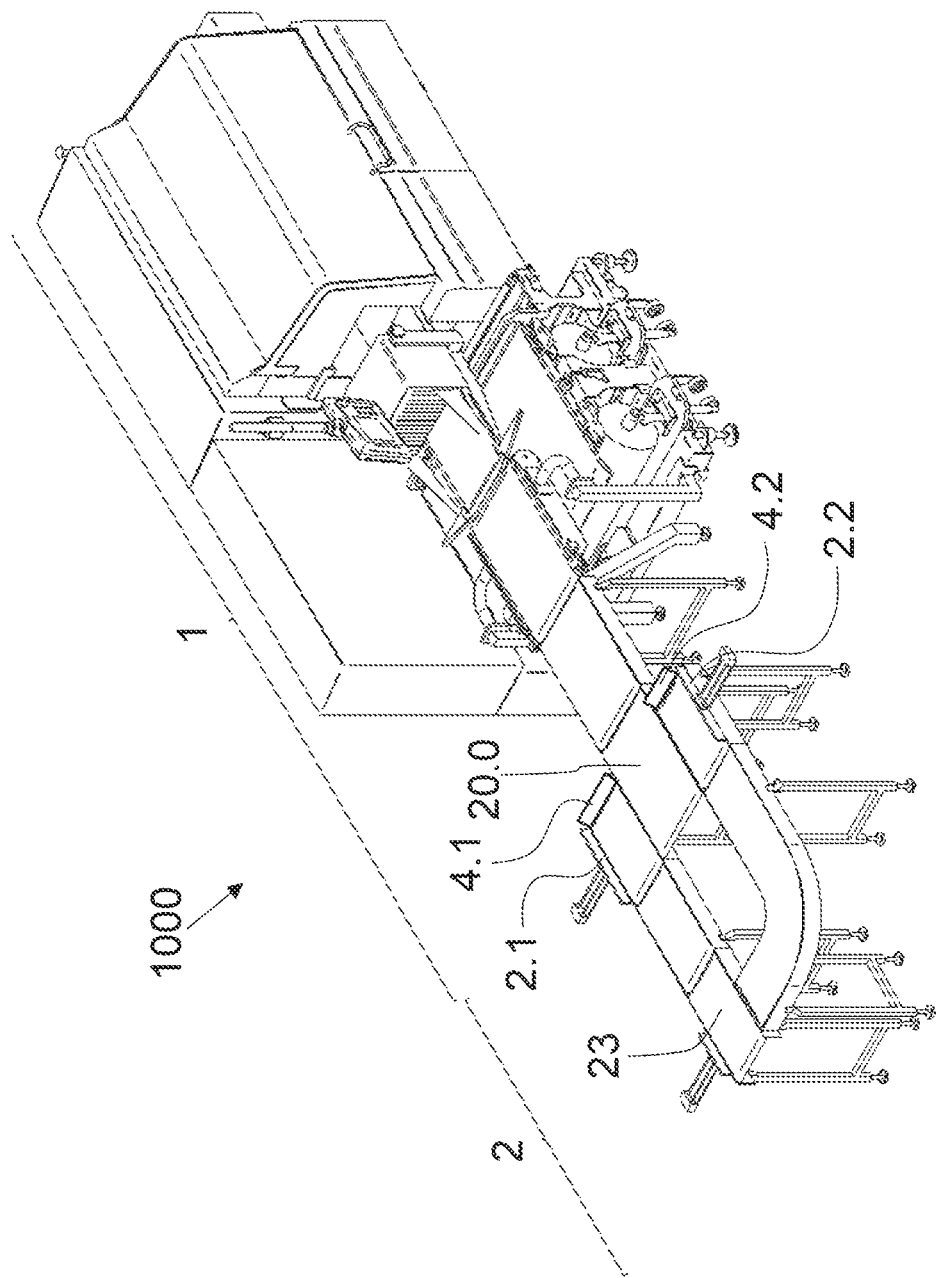
FIG. 13 shows a configuration of the first product path and a second product path for a grouping machine of a product packaging installation according to another embodiment.

In FIG. 13 another embodiment of the installation 1000 is shown. In said embodiment, the grouping area 20 is arranged between the product paths, as in the preferred embodiment, but not in the direction of the products P along said product paths. In contrast to the preferred embodiment, the products P are arranged directly on the batch feeding conveyor belt when arriving at the grouping area 20 (as in the embodiment shown in FIG. 12). Said batch feeding conveyor belt can be controlled as the batch feeding conveyor belt 20.0 of the preferred embodiment. The embodiment shown in FIG. 13 comprises, as the preferred embodiment, a first positioning product belt 21.0 and a second positioning product belt 22.0, the related explanation given for said preferred embodiment being then also valid for said embodiment.

In some embodiments of the installation 1000, the grouping machine 2 comprises a first stop 4.1 to stop the movement of the product P that is transported from the product receiving area 23 towards the grouping area 20 through the first product path. This is the case for the embodiments where the grouping area 20 is arranged between the last portions of the first product path and the second product path, as in the preferred embodiment, but that do not comprise a first positioning conveyor belt as the one disclosed for the preferred embodiment (or an analog device). Therefore, The last portion 21.1 of the first product path is arranged on the conveyor belt 21 and the first stop 4.1 is required to maintain the corresponding products P in said last portion while other products P are being supplied, until the required number of products P for the first row F1 of the batch 3 to be formed. Analogously a second stop 4.2 is also required for the second product path, in absence of a second positioning conveyor belt as the one disclosed for the preferred embodiment (or an analog device). Said embodiments also requires respective actuation devices for arranging the corresponding products P in the grouping area 20, from the respective last portions.

In some embodiments of the installation 1000 not shown in figures, the grouping area 20 is arranged downstream of a product path in the direction of the products P along said product path, such that a product P travelling through said product path reaches said grouping area 20 without the need of an actuation device. Therefore, the grouping machine 2 comprises a stop to stop the products in the grouping area 20, on said platform, until a batch 3 is formed.

The installation 1000 can also comprise, in any embodiment, a second packaging machine not shown in figures, upstream of the grouping machine 2 and in communication with the product receiving area 23 of said grouping machine 2, said second packaging machine being configured to wrap the products P in a unitary way with a plastic sheet and said wrapped products P being supplied to said product receiving area 23. The second packaging machine can be a packaging machine configured for generating a non-hermetic envelope with stretch film, while the horizontal form-fill-seal packaging machine 1 can be configured for generating modified atmosphere hermetic packages with the batches of non-hermetic packages inside.

A number of aspects of the present disclosure are set out in the following numbered clauses:

Clause 1. A packaging installation comprising a grouping machine (2) configured to form batches (3) of products (P), and a horizontal form-fill-seal packaging machine (1) arranged downstream the grouping machine (2) to package each batch (3) in an individual package from at least one plastic sheet, the packaging machine (1) comprising at least one inlet conveyor belt (10) arranged to receive the batches (3) formed in the grouping machine (2), the grouping machine (2) being configured to form batches (3) of products (P) with at least a first row (F1) and a second row (F2) of products (P), said rows (F1, F2) being parallel and each row (F1, F2) comprising at least one product (P), said grouping machine (2) comprising a product receiving area (23) to receive the products (P) to be grouped into batches (3);
  a grouping area (20) where said products (P) are grouped into batches (3);
  a batch feeding conveyor belt (20.0) arranged in the grouping area (20) and configured to feed the batches (3) formed in said grouping area (20) to the inlet conveyor belt (10) of the packaging machine (1) at a given speed;
  a first product path extending from the product receiving area (23) to the grouping area (20) and comprising a last portion from which the products (P) traveling along said first path arrive at the grouping area (20), said products (P) forming the first row (F1) of each batch (3),
  a second product path extending from said receiving area (23) to said grouping area (20), different from the first product path, and comprising a last portion from which the products (P) traveling along said second path arrive at the grouping area (20), said products (P) forming the second row (F2) of each batch (3); and
  at least one distribution device configured to cause the products (P) present in the product receiving area (23) to be directed towards the required product path, the installation (1000) further comprising a control device configured to cause the controlled actuation of the distribution device and to equalize the speed of the batch feeding conveyor belt (20.0) and the speed of the inlet conveyor belt (10) of the packaging machine (1) at least while a batch (3) is passing from batch feeding conveyor belt (20.0) to said inlet conveyor belt (10), and the grouping machine (2) being adapted for causing the products (P) arriving at the grouping area (20) from the last portion of the first product path and from the last portion of the second product path to have different orientations.

Clause 2. The packaging installation according to claim 1, wherein the grouping area (20) is arranged between the last portion of the first product path and the last portion of the second product path, the grouping machine (2) comprising a first actuation device (2.1) configured to push a product (P) from the last portion of the first product path towards the grouping area (20) when actuated, and a second actuation device (2.2) configured to push a product (P) from the last portion of the second product path towards the grouping area (20) when actuated, the control device being communicated with the first actuation device (2.1) and with the second actuation device (2.2) and being configured to control the actuation of said first actuation device (2.1) and said second actuation device (2.2).

Clause 3. The packaging installation according to claim 2, wherein the control device is configured to cause the simultaneous actuation of the first actuation device (2.1) and the second actuation device (2.2) to arrange the corresponding products (P) in the grouping area (20).

Clause 4. The packaging installation according to any of claims 1 to 3, wherein the grouping machine (2) comprises a first stop to stop or limit the movement of the product (P) that is transported from the product receiving area (23) through the first product path when said product (P) is in the last portion of said first product path, and a second stop to stop or limit the movement of the product (P) that is transported from the product receiving area (23) through the second product path when said product (P) is in the last portion of said second product path.

Clause 5. The packaging installation according to any of claims 2 to 4, wherein the grouping machine (2) comprises a first conveyor belt (21) and a first positioning conveyor belt (21.0) arranged downstream the first conveyor belt (21), said first conveyor belt (21) and said first positioning conveyor belt (21.0) defining the first product path, the first positioning conveyor belt (21.0) comprising the last portion of the first product path and being configured to position the products (P) arrived from the first conveyor belt (21) in a controlled manner, and a second conveyor belt (22) and a second positioning conveyor belt (22.0) arranged downstream the second conveyor belt (22), said second conveyor belt (22) and said second positioning conveyor belt (22.0) defining the second product path, and the second positioning conveyor belt (22.0) comprising the last portion of the second product path and being configured to position the products (P) arrived from the second conveyor belt (22) in a controlled manner.

Clause 6. The packaging installation according to any of claims 2 to 5, wherein the grouping machine (2) comprises a platform (20.1) in the grouping area (20), on which the products (P) forming the batches (3) are arranged, and a platform actuator configured to cause a movement of said platform (20.1) when actuated, the batch feeding conveyor belt (20.0) being arranged below the platform (20.1) such that when the platform (20.1) is moved, the products (P) arranged on said platform (20.1) fall towards the batch feeding conveyor belt (20.0), the control device being configured to cause the actuation of the platform actuator when the required number of products (P) has been arranged on said platform (20.1) and being also configured to cause the batch feeding conveyor belt (20.0) to remain stopped or to be driven at a drive speed lower than the given feeding speed at least until all the products (P) forming a batch (3) are arranged on said batch feeding conveyor belt (20.0).

Clause 7. The packaging installation according to claim 6, wherein on the batches (3) are formed on the platform (20.1), a batch (3) falling onto the batch feeding conveyor belt (20.0) when the platform (20.1) is moved.

Clause 8. The packaging installation according to claim 6, wherein a batch (3) comprises a plurality of floors, each floor comprising at least one product (P), the control device being configured for moving the platform (20.1) when a floor is formed such that each time said platform (20.1) is moved a floor for a batch (3) falls towards the batch feeding conveyor belt (20.0), the corresponding batch (3) being formed on said batch feeding conveyor belt (20.0) and the control device being further configured to cause the batch feeding conveyor belt (20.0) being stopped until a batch (3) is formed on said batch feeding conveyor belt (20.0).

Clause 9. The packaging installation according to any of claims 6 to 8, wherein the platform (20.1) comprises two facing sheets (20.10), the platform actuator causing an opening being generated between both sheets (20.10) when actuated, the batch (3) of products (P) being arranged on said platform (20.1) falling onto the batch feeding conveyor belt (20.0) passing through said opening.

Clause 10. The packaging installation according to any of claims 1 to 5, wherein the batch feeding conveyor belt (20.0) is arranged in the grouping area (20) such that the products (P) arriving at said grouping area (20) are arranged directly on said batch feeding conveyor belt (20.0).

Clause 11. The packaging installation according to claim 10, wherein the grouping machine (2) comprises a first stop to stop or limit the movement of the product (P) that is transported from the product receiving area (23) through the first product path, in the last portion of the first product path or once said product (P) is arranged in the grouping area (20), and a second stop to stop or limit the movement of the product (P) that is transported from the product receiving area (23) through the second product path, in the last portion of the second product path or once said product (P) is arranged in the grouping area (20).

Clause 12. The packaging installation according to claim 11, wherein the grouping area (20) is arranged downstream of the one of the product paths, such that the products (P) that are transported through said product path are automatically arranged in said grouping area (20), the grouping machine (2) comprising an actuation device (2.1; 2.2) configured to cause the products (P) to move to the grouping area (20) from the last portion of the product path not being arranged upstream the grouping area (20) and being faced to said grouping area (20), the products (P) arriving at the grouping machine (2) being arranged on the batch feeding conveyor belt (20.0).

Clause 13. The packaging installation according to any of claims 1 to 12, wherein the first product path defines a first linear portion starting from the product receiving area (23), the distribution device comprising a pusher (24) configured to push a product (P) present in the product receiving area (23) towards the second product path in a direction which is perpendicular to the first linear portion of the first product path, said second product path being configured such that a product (P) traveling through said second product path changes the orientation 90° when reaching the grouping area (20).

Clause 14. The packaging installation according to any of claims 1 to 13, wherein the distributor device is configured to guide a product (P) present in the product receiving area (23) towards the first product path or the second product path when actuated, the grouping machine (2) comprising at least one orientation deviation device (51) associated to at least one of the product paths and configured to act on a product (P) traveling through said product path when actuated, for changing 90° the orientation of said product (P).

Clause 15. The packaging installation according to any of claims 1 to 14, wherein the control device is configured to cause the batch feeding conveyor belt (20.0) to remain stopped or to be driven at a drive speed lower than the given feeding speed at least until all the products (P) forming a batch (3) are arranged on the batch feeding conveyor belt (20.0).

Clause 16. The packaging installation according to claim 15, wherein the grouping machine (2) comprises a movable surface or platform (20.1) in the grouping area (20), such that the products (P) arriving at said grouping area (20) are arranged on said movable surface or platform (20.1), and the batch feeding conveyor belt (20.0) being arranged below said movable surface or platform (20.1) such that the products (P) fall onto said batch feeding conveyor belt (20.0) when the movement of said movable surface or platform (20.1) is caused.

Clause 17. The packaging installation according to any of claims 1 to 16, comprising a second packaging machine upstream of the grouping machine (2) and in communication with the product receiving area (23) of said grouping machine (2), the second packaging machine being configured to wrap the products (P) in a unitary way with a plastic sheet, said wrapped products (P) being supplied to said product receiving area (23).

What is claimed is:

1. A packaging installation comprising:
a grouping machine configured to form batches of products so that a first set of products is arranged in a first row and a second set of products is arranged in a second row, the second row being parallel to the first row, each of the first and second set of products including one or more products;
a horizontal form-fill-seal packaging machine arranged downstream the grouping machine to package each of the batches of products in an individual package from at least one plastic sheet, the horizontal form-fill-seal packaging machine including at least one inlet conveyor belt arranged to receive the batches of products formed in the grouping machine;
the grouping machine comprising:
a product receiving area configured to receive the first and second set of products to be grouped into the batches of products;
a grouping area where the first and second set of products are grouped into the batches products;
a batch feeding conveyor belt located in the grouping area and configured to feed the batches of products formed in the grouping area to the inlet conveyor belt of the horizontal form-fill-seal packaging machine at a given speed;
a first pathway extending from the product receiving area to the grouping area along which the first set of products travel, the first pathway comprising a last portion from which the first set of products arrive at the grouping area, the first set of products forming the first row of each of the batches of products;
a second pathway extending from the product receiving area to the grouping area along which the second set of products travel, the second pathway comprising a last portion from which the second set of products arrive at the grouping area, the second set of products forming the second row of each of the batches of products; and one or more distribution devices that are configured to cause the first set of products in the product receiving area to be directed towards the first pathway and to cause the second set of products in the product receiving area to be directed towards the second pathway;

the grouping machine being configured to cause the first set of products in the grouping area to have a first orientation and to cause the second set of products in the grouping area to have a second orientation, the first and second orientations being different from one another;

a control device configured to cause the controlled actuation of the one or more distribution devices and to equalize the speed of the batch feeding conveyor belt of the grouping machine and the speed of the inlet conveyor belt of the horizontal form-fill-seal packaging machine at least while one of the batches of products is passing from the batch feeding conveyor belt to the inlet conveyor belt;

wherein the first pathway includes a linear portion starting from the product receiving area on which the first set of products are transported, the one or more distribution devices comprising a pusher configured to push a product of the second set of products present in the product receiving area towards the second pathway in a direction which is perpendicular to the first linear portion of the first pathway, the second pathway being configured such that products of the second set of products traveling through the second pathway are rotated before reaching the grouping area.

2. The packaging installation according to claim 1, wherein the grouping area is located between the last portion of the first pathway and the last portion of the second pathway, the grouping machine comprising:
a first actuation device that when actuated is configured to push a product of the first set of products from the last portion of the first pathway towards the grouping area;
a second actuation device that when actuated is configured to push a product of the second set of products from the last portion of the second pathway towards the grouping area;
the control device configured to control an actuation of each of the first and second actuation devices.

3. The packaging installation according to claim 2, wherein the control device is configured to cause a simultaneous actuation of the first and second actuation devices.

4. The packaging installation according to claim 2, wherein the grouping machine includes:
a first conveyor belt and a first positioning conveyor belt located downstream the first conveyor belt, the first conveyor belt and the first positioning conveyor belt defining at least in part the first pathway, the first positioning conveyor belt comprising the last portion of the first pathway; and
a second conveyor belt and a second positioning conveyor belt located downstream the second conveyor belt, the second conveyor belt and the second positioning conveyor belt defining at least in part the second pathway, the second positioning conveyor belt comprising the last portion of the second pathway.

5. The packaging installation according to claim 1, wherein the grouping machine includes:
a first stop in the last portion of the first pathway to stop or limit the movement of the first set of products; and
a second stop in the last portion of the second pathway to stop or limit the movement of the second set of products.

6. The packaging installation according to claim 1, wherein the grouping machine includes:
a first conveyor belt and a first positioning conveyor belt located downstream the first conveyor belt, the first conveyor belt and the first positioning conveyor belt defining at least in part the first pathway, the first positioning conveyor belt comprising the last portion of the first pathway; and
a second conveyor belt and a second positioning conveyor belt located downstream the second conveyor belt, the second conveyor belt and the second positioning conveyor belt defining at least in part the second pathway, the second positioning conveyor belt comprising the last portion of the second pathway.

7. The packaging installation according to claim 1, wherein the grouping machine includes:
a platform in the grouping area on which the batches of products are arranged;
a platform actuator, that when actuated, is configured to cause a movement of the platform, the batch feeding conveyor belt being arranged below the platform such that when the platform is moved, the batch of products arranged on the platform fall towards and onto the batch feeding conveyor belt, the control device being configured to cause the batch feeding conveyor belt to stop or to be driven at a reduced drive speed until a batch of products is arranged on the batch feeding conveyor belt.

8. The packaging installation according to claim 7, wherein the control device is configured to cause the actuation of the platform actuator upon a batch of products being formed on the platform.

9. The packaging installation according to claim 7, wherein the platform comprises first and second sheets that face one another, when actuated, the platform actuator is configured to cause an opening to be generated between the first and second sheets such that the batch of products arranged on the platform fall through the opening towards and onto the batch feeding conveyor belt.

10. The packaging installation according to claim 1, wherein each of the batch of products comprises at least first and second floors of products, the second floor of products being arranged atop the first floor of products, the packaging installation further comprising a platform in the grouping area on which each of the first and second floors are independently arranged at different times, a platform actuator, that when actuated, is configured to cause a movement of the platform from an initial position to an actuated position, the batch feeding conveyor belt being arranged below the platform such that when the platform is moved a first time from the initial position to the actuated position the first floor of products arranged on the platform falls onto the batch feeding conveyor belt and such that when the platform is moved a second time, after the first time, from the initial position to the actuated position the second floor of products arranged on the platform falls onto the first floor of products, the control device being configured to cause the batch feeding conveyor belt to stop until a batch of products is arranged on the batch feeding conveyor belt.

11. The packaging installation according to claim 1, wherein the batch feeding conveyor belt is arranged in the grouping area such that the first and second set of products arriving at the grouping area are arranged directly on the batch feeding conveyor belt.

12. The packaging installation according to claim 11, wherein the grouping machine includes;
- a first stop in the last portion of the first pathway to stop or limit the movement of the first set of products; and
- a second stop in the last portion of the second pathway to stop or limit the movement of the second set of products.

13. The packaging installation according to claim 11, wherein the last portion of the first pathway is configured to transport the first set of products in a first direction onto the batch feeding conveyor belt and the last portion of the second pathway is configured to transport the second set of products in a second direction onto the batch feeding conveyor belt, the second direction being different than the first direction.

14. The packaging installation according to claim 13, wherein the second direction is perpendicular to the first direction.

15. The packaging installation according to claim 1, wherein the second pathway is configured such that products of the second set of products traveling through the second pathway are rotated 90 degrees before reaching the grouping area.

16. The packaging installation according to claim 1, wherein the first pathway includes an orientation deviation device that is configured to rotate the products of the first set of products.

17. The packaging installation according to claim 16, wherein the orientation deviation device is configured to rotate the products of the first set of products 90 degrees.

18. The packaging installation according to claim 1, wherein the control device is configured to cause the batch feeding conveyor belt to stop or to be driven at a reduced drive speed until all the products forming a batch of products are arranged on the batch feeding conveyor belt.

19. The packaging installation according to claim 1, further comprising a second packaging machine upstream of the grouping machine and in communication with the product receiving area of the grouping machine, the second packaging machine being configured to individually wrap the products in a plastic sheet before the products are supplied to the product receiving area.

20. A packaging installation comprising:
- a grouping machine configured to form batches of products so that a first set of products is arranged in a first row and a second set of products is arranged in a second row, the second row being parallel to the first row, each of the first and second set of products including one or more products;
- a horizontal form-fill-seal packaging machine arranged downstream the grouping machine to package each of the batches of products in an individual package from at least one plastic sheet, the horizontal form-fill-seal packaging machine including at least one inlet conveyor belt arranged to receive the batches of products formed in the grouping machine;
- the grouping machine comprising:
  - a product receiving area configured to receive the first and second set of products to be grouped into the batches of products;
  - a grouping area where the first and second set of products are grouped into the batches products;
  - a batch feeding conveyor belt located in the grouping area and configured to feed the batches of products formed in the grouping area to the inlet conveyor belt of the horizontal form-fill-seal packaging machine at a given speed;
  - a first pathway extending from the product receiving area to the grouping area along which the first set of products travel, the first pathway comprising a last portion from which the first set of products arrive at the grouping area, the first set of products forming the first row of each of the batches of products;
  - a second pathway extending from the product receiving area to the grouping area along which the second set of products travel, the second pathway comprising a last portion from which the second set of products arrive at the grouping area, the second set of products forming the second row of each of the batches of products; and
  - one or more distribution devices that are configured to cause the first set of products in the product receiving area to be directed towards the first pathway and to cause the second set of products in the product receiving area to be directed towards the second pathway;
  - the grouping machine being configured to cause the first set of products in the grouping area to have a first orientation and to cause the second set of products in the grouping area to have a second orientation, the first and second orientations being different from one another;
- a control device configured to cause the controlled actuation of the one or more distribution devices and to equalize the speed of the batch feeding conveyor belt of the grouping machine and the speed of the inlet conveyor belt of the horizontal form-fill-seal packaging machine at least while one of the batches of products is passing from the batch feeding conveyor belt to the inlet conveyor belt;
- a first stop in the last portion of the first pathway to stop or limit the movement of the first set of products; and
- a second stop in the last portion of the second pathway to stop or limit the movement of the second set of products.

* * * * *

UNITED STATES PATENT AND TRADEMARK OFFICE
CERTIFICATE OF CORRECTION

PATENT NO. : 11,760,582 B2
APPLICATION NO. : 17/503706
DATED : September 19, 2023
INVENTOR(S) : Aitzol Aramburu Eizaguirre It is certified that error appears in the above-identified patent and that said Letters Patent is hereby corrected as shown below:

In the Specifications

Column 1, Line 8, change "March 11, 2021" to --November 3, 2020--.

Signed and Sealed this
Ninth Day of April, 2024

Katherine Kelly Vidal
*Director of the United States Patent and Trademark Office*